May 8, 1956 J. J. A. PEEK 2,744,961
RECEIVER FOR TWO AMPLITUDE-MODULATED WAVES
Filed June 21, 1951
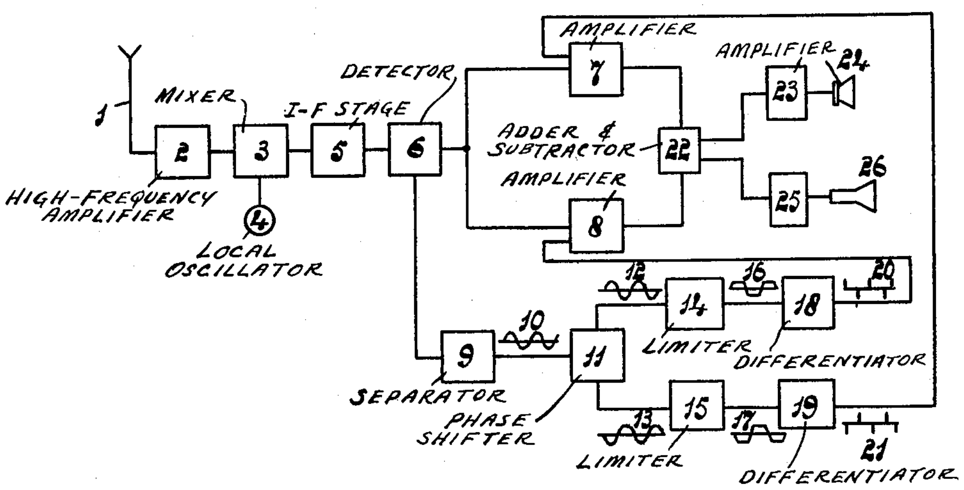
INVENTOR.
JOHANNES JOSEPHUS ALPHONSUS PEEK
BY Fred M Vogel
AGENT

United States Patent Office 2,744,961

Patented May 8, 1956

2,744,961

RECEIVER FOR TWO AMPLITUDE-MODULATED WAVES

Johannes Josephus Alphonsus Peek, Eindhoven, Netherlands, assignor to Hartford National Bank and Trust Company, Hartford, Conn., as trustee Application June 21, 1951, Serial No. 232,716

Claims priority, application Netherlands July 1, 1950

4 Claims. (Cl. 179—15)

This invention relates to receivers for the simultaneous reception of two amplitude-modulated carrier-waves. In known receivers of this type, which may be used as television receivers picking up a first carrier-wave amplitude-modulated with the vision signal and a second carrier-wave amplitude-modulated with the sound signal, these carriers or I. F. carriers derived therefrom are, prior to demodulation, separated from one another in order that the low-frequency sound signal may not pass via the vision channel to the cathode-ray tube.

The invention has for its object to avoid the need for such separation. A receiver according to this invention comprises a transmission-path common to both received signals up to and including the amplitude detector, the output signals of the amplitude detector being supplied to two channels, having the same amplification factor, of which one is periodically open only at instants at which the oscillation that occurs at the output of the amplitude-detector and whose frequency corresponds to the frequency difference of the carrier-waves preceding the amplitude-detector attains its maximum value whilst the other channel is periodically open only at instants at which the said oscillation has its minimum value, the output signals of both channels being combined in a positive sense and supplied to a first reproducing device and the output signals of both channels being combined in a negative sense and supplied to a second reproducing device.

The arrangement according to the invention is based on the following theory.

If the signals preceding the amplitude-detector be represented by $V(t)$ sin $\omega_1 t$ and $G(t)$ sin $\omega_2 t$, where $\omega_1$ and $\omega_2$ represent the angular frequencies of the two high-frequency or intermediate-frequency carrier-waves, $t$ the time and $V(t)$ and $G(t)$ two arbitrary functions of time implicitly comprising the two signals, joint detection yields a signal $$\sqrt{V^2(t)+2V(t)G(t)\cos\Omega t+G^2(t)}$$

where $\Omega=\omega_2-\omega_1$ represents the difference-frequency of the two carrier-waves prior to detection.

If this signal is supplied to a channel which is open at an instant $t=t_1$ at which $\cos \Omega t_1=+1$ the output voltage of this channel at the said instant is equal to $$V(t_1)+G(t_1)$$

The output signal of a second channel which is open at an instant $t=t_1+\Delta$, at which $\cos(t_1+\Delta)=-1$, is at this instant equal to $V(t_1+\Delta)-G(t_1+\Delta)$.

Addition of the two outputs yields $$V(t_1)+V(t_1+\Delta)+G(t_1)-G(t_1+\Delta)$$

which, if both signals have altered only slightly during the time interval $\Delta$, yields approximately $2V(t_1)$. Subtraction of the two voltages yields $$V(t_1)+G(t_1)-V(t_1+\Delta)+G(t_1+\Delta)$$

or approximately $2G(t_1)$.

If the frequency difference of the two carrier-waves is considerable in relation to the band-width of each of the incoming signals, the distortion occurring considered to the aforesaid degree of approximation, is negligible, but if this difference only slightly exceeds the widest side-band value occurring in the frequency spectrum, as is often the case in television transmitters, a certain amount of distortion will occur for the maximum modulation frequencies.

It is necessary for the two channels to be open substantially in the correct phase of the oscillation having the difference frequency $\Omega$ but, as appears from the formula for the detected signal, a small difference in phase involves distortion only of a second order owing to the cos $\Omega t$ occuring in the formula.

It is desirable that little phase-modulation should occur in addition to amplitude-modulation in the transmitter used with a receiver according to the invention. Considering television transmitters, the vision signal is frequently transmitted with one complete and one partial sideband and the receiver then has a response curve with an oblique flank, the carrier-wave frequency being located on this oblique flank at about half the amplitude of the response curve (vestigial-sideband system).

With such a transmitted signal a certain phase-modulation occurs, which depends upon the degree of modulation of the amplitude-modulated vision-signal.

If the amplitude of the vision carrier-wave is not reduced to an excessively low value, the width of the partially transmitted side-band is not too small and the slope of the response curve of the receiver not too steep, no trouble will be experienced from the phase-modulation.

The oscillation having the aforesaid difference frequency may be taken from the output signal of the amplitude-detector, and, in order to prevent trouble from frequency differences occurring between side-band components of the two signals and corresponding substantially to the desired frequency difference, this should be effected in a sufficiently selective manner.

In order that the invention may be readily carried into effect, one receiver according thereto will now be described with reference to the accompanying block-diagram. Two carrier-waves modulated with vision signals and sound signals respectively are supplied by way of an aerial 1, a high-frequency amplifier 2, and a mixer stage 3 comprising a local oscillator 4 to an intermediate-frequency stage 5, the two intermediate-frequency signals being jointly demodulated in a detector 6.

The demodulated signal is supplied to two amplifiers 7 and 8 having the same amplification factor, and, moreover, to a device 9 for separating the aforesaid oscillation cos $\Omega t$.

The device 9 comprises, for example, a circuit tuned very selectively to the angular frequency $\Omega$ or an oscillator tuned to the angular frequency $\Omega$ and controlled by the output voltage of detector 6.

Two oscillations 12 and 13 in phase opposition, which are each displaced by 90° with respect to the signal 10 from device 9 but in opposite senses, are derived from the output voltage 10 of the arrangement 9 by phase-displacement and phase reversal in a device 11 of known form.

In devices 14 and 15 also of known type, these oscillations are limited at both peaks and the clipped signals 16 and 17 thus produced are differentiated in devices 18 and 19, and if required, amplified.

The pulse signals 20 set up in the output circuit of the device 18 are supplied, say with the polarity indicated in the drawing, to the input of amplifier 8. This amplifier is normally cut off by means of a negative bias applied to a control grid, for example that of the first discharge tube, and those pulses of the signal 20 which are of positive polarity periodically render the amplifier conductive at the desired instant.

Similarly, the pulse signal 21 is supplied to the amplifier 7 which is normally cut off in the same manner.

The output voltages of the amplifiers 7 and 8 are supplied to a device 22, in which these voltages are on the one hand added and on the other hand subtracted.

This may, for example, be effected by supplying each of the output signals of amplifiers 7 and 8 to a control grid of two different tubes having a common cathode-impedance and a push-pull output, the sum voltage being taken from the cathode impedance and the difference voltage being taken from the push-pull output.

One signal is supplied, if desired, by way of an amplifier 23, to a loudspeaker 24 and the other signal is supplied to a cathode-ray tube 26, if desired through an amplifier 25.

What I claim is:

1. A receiver for the simultaneous reception of an incoming signal constituted by two distinct carriers having a predetermined frequency displacement, each carrier having an amplitude modulation component, said receiver comprising means to demodulate said signal and including an amplitude detector responsive to both amplitude-modulated carriers, first and second amplifying channels having the same amplification factor, the input of both channels being coupled to the output of said detector, control means coupled to said detector to render said first channel operative periodically only at the instants an oscillation whose frequency corresponds to said frequency displacement attains its maximum value and to render said second channel operative periodically only at the instants said oscillation attains its minimum value, and combining means coupled to the output of both channels to combine the outputs thereof positively to develop a first output voltage and to combine the outputs thereof differentially to produce a second output voltage.

2. A receiver, as set forth in claim 1, wherein said control means includes a selective circuit tuned to the frequency of said oscillation and coupled to the output of said detector to derive therefrom said oscillation, phase-shift means coupled to said selective circuit to produce first and second waves in phase-opposition, wave shaping means to form said waves into first and second pulse trains whose instants correspond to the maximum values of said waves, and means to apply said first and second trains to said respective channels to render same conductive accordingly.

3. A receiver, as set forth in claim 2, wherein said wave shaping means is constituted by a limiter stage to clip the applied wave and a differentiating network to convert the clipped wave into pulses.

4. A receiver, as set forth in claim 3, wherein said combining means is constituted by a circuit including a pair of electron discharge tubes each having a cathode, a control grid and an anode, a common cathode impedance for said tubes, a push-pull output impedance coupling the anodes of said tubes, means to apply the outputs of said first and second channels to the respective grids of said tubes, means to derive said first output voltage from across said cathode impedance, and means to derive said second output voltage from said push-pull impedance.

References Cited in the file of this patent

UNITED STATES PATENTS

| | | |
|---|---|---|
| 2,056,607 | Holmes | Oct. 6, 1936 |
| 2,256,317 | Earp | Sept. 16, 1941 |
| 2,352,634 | Hull | July 4, 1944 |
| 2,543,037 | Mayle | Feb. 27, 1951 |